United States Patent

Andrist et al.

[11] Patent Number: 5,508,366
[45] Date of Patent: Apr. 16, 1996

[54] CONTINUOUS PRODUCTION OF REDUCED GEL CONTENT HYDROXYLATED ADDITION POLYMERS

[75] Inventors: Kevin M. Andrist; J. David Campbell; Richard W. Chylla; Rakesh K. Popli, all of Racine, Wis.

[73] Assignee: S. C. Johnson & Son, Inc., Racine, Wis.

[21] Appl. No.: 325,001

[22] Filed: Oct. 18, 1994

[51] Int. Cl.$^6$ .................................................... C08F 20/26
[52] U.S. Cl. ........................... 526/320; 526/74; 526/89; 526/210; 526/212; 526/217; 526/317.1; 526/318.3; 526/318.4; 526/318.42; 526/329.2
[58] Field of Search .................... 526/320, 74, 318.42

[56] References Cited

U.S. PATENT DOCUMENTS

| | | | |
|---|---|---|---|
| 3,575,946 | 4/1971 | Chromecek | 260/86.1 |
| 3,764,384 | 10/1973 | Berni | 134/12 |
| 3,988,213 | 10/1976 | Yoshida et al. | 203/9 |
| 4,014,754 | 3/1977 | Berni et al. | 203/64 |
| 4,136,245 | 1/1979 | Massoubre | 526/174 |
| 4,172,177 | 10/1979 | Sato | 428/413 |
| 4,276,210 | 6/1981 | Höhlein | 525/161 |
| 4,276,432 | 6/1981 | Rhum | 560/190 |
| 4,301,266 | 11/1981 | Muenster et al. | 526/212 |
| 4,351,931 | 9/1982 | Armitage | 526/227 |
| 4,414,370 | 11/1983 | Hamielec | 526/88 |
| 4,485,225 | 11/1984 | Satoh et al. | 526/331 |
| 4,529,787 | 7/1985 | Schmidt et al. | 526/317 |
| 4,546,160 | 10/1985 | Brand | 526/320 |
| 4,728,701 | 3/1988 | Jarvis et al. | 526/65 |
| 4,865,705 | 9/1989 | Hendrikx | 204/181.7 |
| 4,921,755 | 5/1990 | Carroll, Jr. | 428/328 |
| 5,003,021 | 3/1991 | Kasahara et al. | 526/342 |
| 5,028,674 | 7/1991 | Hatch et al. | 526/216 |
| 5,057,593 | 10/1991 | Marshall et al. | 528/271 |
| 5,064,557 | 11/1991 | Fusiak | 252/162 |
| 5,110,582 | 5/1992 | Hungerbühler | 424/47 |
| 5,210,111 | 5/1993 | Goldenberg | 523/108 |

FOREIGN PATENT DOCUMENTS

0457355A2  11/1991  European Pat. Off. .

OTHER PUBLICATIONS

J. Lebduška et al. "Solution Copolymerization of 2–Hydroxyethyl Methacrylate and Styrene", J. Bly. Sci., Polym. Lett. Ed., (1984) 22(5) 261–265.

Ship Shape® Resin Cleaner Brochure, No. 2032–272 5M–1193, International Specialty Products, 9 pages, 1993.

Ship Shape–Resin Cleaner, Material Safety Data Sheet, MSDS No. 1106.8 Rev. 8, date 04 Nov. 1993, 7 pages.

M. A. Stuart et al., "Displacement of Polymers I. Theory", J. Colloid and Interface Science, vol. 97, No. 2, pp. 515 . 525, Feb., 1984.

M. A. Stuart et al., "Displacement of Polymers II. Experiment.", J. Colloid and Interface Science, vol. 97, No. 2, pp. 526–535, Feb., 1984.

Chemical Abstract No. 86:107233f (I. Shionohara et al.) 1977.

Chemical Abstract No. 103:71754e (K. Ito et al.) 1985.

Chemical Abstract No. 97:216775g (K. Patel et al.) 1982.

Chemical Abstract No. 86:107232e (I. Shinohara et al.) 1977.

*Primary Examiner*—Fred Zitomer
*Attorney, Agent, or Firm*—R. E. Rakoczy; J. W. Frank

[57] ABSTRACT

A process is disclosed for the continuous production, with reduced gel formation, of free radical addition polymers from ethylenically unsaturated monomers containing at least one free hydroxyl group such as 2-hydroxyethyl methacrylate, from about 0 to about 5% by weight of an alpha-beta unsaturated carboxylic acid such as acrylic acid or methacrylic acid, and the remainder of the monomers used are free radical addition copolymerizable compounds such as styrene, methyl methacrylate and butyl acrylate. The free radical addition polymerization is conducted at from about 150° C. to about 310° C. under superatmospheric pressure in the presence of one or more solvents. The solvent or the volume average of the solvent mixture has an overall calculated root mean square value of the hydrogen bonding and polar contributions of each solvent's solubility parameters in the range of from about 6 to about 15. The solvent or solvents in total have sufficient volatility under the conditions being used to conduct the polymerization such that any liquid condensate of vapor mixture forming on interior surfaces of the reactor equipment located above the surface of the monomer reactants contains at least 50 mole percent of the solvent to reduce gel formation on such interior surfaces. The process permits the continuous polymerization of the polymers over extended periods of time with reduced formation of gel particles and gel deposits.

30 Claims, No Drawings

CONTINUOUS PRODUCTION OF REDUCED GEL CONTENT HYDROXYLATED ADDITION POLYMERS

TECHNICAL FIELD

This invention relates to a continuous polymerization method for making addition polymers polymerized from ethylenically unsaturated monomers containing free alkyl-bonded hydroxyl groups characterized by the use of certain solvents that tend to reduce the formation of gel deposits on the interior surfaces of the polymerization equipment and gel particles in the polymers produced.

BACKGROUND ART

Reactor fouling caused by the formation of particles and deposits of insoluble polymeric materials ("gels") during addition polymerization procedures is undesirable from both an economic and a product quality standpoint. Various approaches have been developed to reduce or eliminate the formation of such gel deposits.

The problem of gel deposits formed during addition polymerizations seems related to the type of polymers being made. The monomers used have different degrees of polarity, different boiling points and different tendencies to self-polymerize, for example, when they condense on interior surfaces of a reactor.

For example, U.S. Pat. No. 3,988,213 to Yoshida et al. addresses the problem of gel deposit formation during the distillation of vinyl compounds such as hydroxyethyl acrylate, acrylic acid and glycidyl methacrylate. Yoshida et al. teach that these monomers have a much greater tendency to self-condense than other commonly used monomers such as styrene, vinyl acetate, esters of unsaturated carboxylic acids such as methyl acrylate and methyl methacrylate, and vinyl chloride. In addition to the use of a polymerization inhibitor, Yoshida et al. suggest the use of a specific type of distillation tower that is heated. The inner walls of the tower are maintained at a temperature sufficient to prevent condensation of the vapor being distilled. As a result, Yoshida et al. teach that such monomers can be distilled with less formation of polymers from the monomers being distilled. Such polymers become gel deposits that tend to foul the distillation tower and may contaminate the desired distilled monomer product.

A similar gel formation problem occurs during the free radical polymerization of monomers to form addition polymers. We have found that an especially troublesome gel formation problem occurs during the manufacture of addition polymers containing hydroxylated alkyl acrylates and alkyl methacrylates such as hydroxyethyl methacrylate.

It is believed that one potential source of gel particles and deposits results from the formation of initially soluble polymer deposits on the reactor surfaces and associated processing equipment. These eventually lead to higher and higher molecular weight polymers that ultimately become insoluble gels. Gel formation is much less of a problem when addition polymers are made via a batch or semi-batch polymerization process because the polymer is emptied from the reactor upon completion of the polymerization. This provides an opportunity to clean the reactor and associated processing equipment such as condensers, piping and evaporators prior to charging the next batch.

For example, U.S. Pat. No. 3,764,384 to Berni, assigned to GAF Corporation, teaches a method for removing polyvinyl halide residues from processing equipment. Berni uses a solvent cleaning technique based upon contacting such residues with N-methyl-2-pyrrolidone ("NMP") to loosen, suspend or dissolve the residues and permit them to be flushed out of the polymer processing equipment. International Specialty Products of Wayne, N.J. sells a line of GAF® chemical cleaning solvents containing NMP under the trademark ShipShape® Resin Cleaner for removing resin deposits such as those from acrylic polymers.

However, gel formation is a much greater problem when polymerization processing equipment such a continuous stirred tank reactor ("CSTR") or a tube reactor is used to continuously produce an addition polymer. Examples of the production of polymers in such equipment can be seen from an examination of U.S. Pat. Nos. 4,414,370 to Hamielec et al.; 4,529,787 to Schmidt et al.; and 4,546,160 to Brand et al. These patents teach the continuous production of various types of polymers by free radical addition processes where the polymers may include hydroxylated acrylic acid or methacrylic acid esters. These patents also teach that various solvents may be used. Hamielec et al. teaches that not all solvents are desirable to produce polymers having the desired molecular weights and narrow molecular weight distribution.

Continuous processing equipment is expensive to shut down and start up in terms of lost production time. Thus, it is very desirable to minimize shutdowns for cleaning of such equipment.

Another problem we have observed occurs when different types of addition polymers are sequentially made in the same continuous processing equipment. For economic reasons, one production CSTR is sometimes used to produce a variety of addition polymers. We have observed that when acrylic acid-containing addition polymers are made in a CSTR followed by a production run of a hydroxy-functional addition polymer containing hydroxyethyl methacrylate, gel deposit formation in the CSTR is accelerated as evidenced by gel particles in the latter polymer. Without wishing to be bound by theory, it is thought that the acrylic acid-functional addition polymer is leaving adsorbed polymeric deposits in the reactor processing equipment that serve to increase the formation of gel deposits. These deposits appear to exist even though the internal reactor surfaces tend to be visually clean to the naked eye.

Prior art attempts to reduce reactor fouling in continuous polymerization processes have, among other things, focused on the type of solvent used during the polymerization. Efforts addressed at solving this problem for rather specific combinations of monomers have failed to appreciate the problems associated with the production of addition polymers containing hydroxy-functional ethylenically unsaturated monomers.

For example, U.S. Pat. No. 5,003,021 to Kasahara et al. teaches the continuous production of 40–95% of an aromatic vinyl compound such as styrene and 5–60% of a vinyl cyanide compound such as acrylonitrile. The formation of gel-like particles in the reactor is reduced by conducting the polymerization at a temperature of from 90° C. to 200° C. in the presence of from about 10 to 100 parts by weight of a solvent. The solvent must contain not less than 40 weight percent of an alcohol such as methyl alcohol, ethyl alcohol, propyl alcohol, butyl alcohol, amyl alcohol and hexyl alcohol with alcohols having 3 to 6 carbons atoms such as secondary-butanol being preferred.

U.S. Pat. No. 4,351,931 to Armitage teaches the continuous manufacture of random copolymers of ethylene and acrylic acid or methacrylic acid having up to about 10 weight percent of the acid monomers. The solvent systems useful for the Armitage process are those previously used for polyethylene manufacture such as benzene, chlorobenzene or tertiary-butanol. Armitage also teaches that polymerization can be conducted in the substantial absence of added solvents except for the amount needed to dissolve the initiator. Nothing is suggested concerning the production of addition polymers containing ethylenically unsaturated monomers containing free hydroxyl groups.

U.S. Pat. No. 5,057,593 to Marshall et al. teaches a continuous process to copolymerize ethylene and carbon monoxide. Optionally, certain other comonomers may be included such as alpha-beta unsaturated carboxylic acids, esters of such acids, anhydrides of such carboxylic acids and vinyl esters of saturated aliphatic acids. Acetone is used to maintain a single phase in the reactor. The acetone is introduced concurrently with the reactant monomers to significantly reduce or eliminate reactor fouling. Column 1, lines 41–51 teach that if comonomers with reactivities substantially equal to ethylene are used, such as vinyl acetate, gel particles normally will not be produced. They conclude that in such a case, the polarity of the monomers will be similar to the that of the polymer being formed and that substantially reduces the likelihood of reactor fouling. The use of a solvent containing at least 50% acetone in the Marshall et al. process is said to overcome the effects of different monomer polarities and thus, reactor fouling, when ethylene is copolymerized with carbon monoxide in the presence of certain other optional comonomers. Use of hydroxy-functional ethylenically unsaturated monomers is not suggested.

U.S. Pat. No. 5,028,674 to Hatch et al. teaches a process for the continuous copolymerization of ethylene with certain polar comonomers such as alpha-beta unsaturated carboxylic acids, esters and glycidyl esters of such acids, and anhydrides of such acids. The copolymerization process is conducted in the presence of from about 2% to about 25% methanol as a solvent, based on the total amount of material flowing through the reactor. This solvent maintains the reactant monomers and the polymer being formed in a single phase which is said to reduce or eliminate reactor fouling. Other solvents may be included such as benzene or tertiary-butanol as long as such solvents do not prevent the methanol from reducing or eliminating reactor fouling. Nothing is taught concerning the use of hydroxy-functional ethylenically unsaturated monomers.

U.S. Pat. No. 4,135,245 to Massoubre relates to organolithium-initiated anionic polymerization of unsaturated monomers such as conjugated dienes with vinyl aromatic compounds, but does discuss the problems associated with gel formation in continuous polymerization processes.

U.S. Pat. No. 4,301,266 to Muenster et al. teaches the production of low molecular weight water soluble polymers of acrylic acid or methacrylic acid. Such monomers are polymerized at 120° C. to 200° C. under at least 2 bars of pressure in the presence of a free radical initiator and a solvent that is either isopropanol or a mixture of isopropanol and water where the mixture contains at least 40% by weight of isopropanol. The polymers may contain up to about 10% by weight of a comonomer such as acrylic acid or methacrylic acid alkyl esters, fumaric acid, maleic acid, monoesters or diesters of fumaric acid, monoesters or diesters of maleic acid, acrylonitrile, methacrylonitrile, acrylamide and methacrylamide. Nothing is mentioned concerning the use of hydroxy-functional ethylenically unsaturated monomers.

U.S. Pat. No. 3,575,946 to Chromecek et al. teaches the production of hydroxylated acrylate polymers in solvents for use as water-swellable eye contact lenses. For example, ethylene glycol monomethacrylate and monoacrylate that is contaminated with 0.05% to 50% of the corresponding diesters is polymerized to obtain a solvent swellable polymer. The solvents used are various polar solvents such as alcohols and may even include some amounts of water. Poor solvents for the polymers such as benzene cannot be used. The monomer concentration is cited as a limiting factor on how much diester contaminant can be present before an insoluble gel will be formed. Fully soluble polymers having molecular weights ranging from several hundred to several millions can be produced. Table 4 and the accompanying text teaches that coefficients of swelling above about 2 are useful in preparing the hydroxylated polymers of Chromecek et al. That appears to preclude the use of acetone (coefficient of swelling=1.58) because "solvents having swelling coefficients smaller than 2 cause the partial formation of insoluble polymers even under the conditions most favorable to the preparation of soluble polymers . . . " column 8, lines 48–50. As will be seen below, acetone was a preferred solvent for use in the process of the present invention.

The prior art lacks a solution to the problems associated with gel formation during the preparation of addition polymers from hydroxy-functional ethylenically unsaturated monomers using a continuous polymerization process. Particularly absent from the prior art is a solution to the gel deposit formation that occurs when the production of such hydroxy-functional polymers is preceded by the preparation of addition polymers containing free carboxyl groups such as those derived from acrylic acid or methacrylic acid. We have found that the use of propylene glycol monomethyl ether acetate ("PM Acetate") results in the formation of gel particles and deposits both below the surface of the monomer reactants and polymer and above the surface at the top of the reactor and on piping associated with the reactor. The presence of these particles and deposits reduced the quality of the polymer product and increased with time, thereby necessitating relatively frequent cleaning of the continuous reactor equipment. After extensive studies of various processes to reduce gel formation during the continuous formation of addition polymers of hydroxy-functional ethylenically unsaturated monomers, we have found a process which reduces the formation of gel particles and deposits during the continuous production of such polymers.

SUMMARY DISCLOSURE OF THE INVENTION

One object of the present invention is to greatly reduce gel formation during the continuous free radical addition polymerization of monomers which include hydroxy-functional ethylenically unsaturated monomers. Another object is to reduce gel formation when a polymer containing such monomers is made following the production of a free radical addition polymer containing free carboxyl groups such as those derived from acrylic acid or methacrylic acid. Still another object is to improve the economy and productivity of continuous production equipment such as CSTR equipment by reducing the number of times such equipment must be shut down for cleaning over a given period of time. Yet another object of the present invention is to provide a process which provides a high quality addition polymer containing hydroxy-functional ethylenically unsaturated monomers with minimal contamination by gel particles.

In a preferred embodiment of the present invention, the object of the invention is to provide a continuous free radical addition polymer production process using a solvent system which will not only (a) act to reduce the formation gel deposits below the surface of the monomer reactants as well as gel particles in the polymer being made, but will also (b) reduce the formation of gel deposits in the headspace above that surface. As a result, the entire reactor and its associated internal structures are kept clean of gel deposits significantly longer than when a solvent such as PM Acetate is used. Another object of this invention is to reduce cross-contamination due to gel deposits from previous production runs when different polymers are sequentially made in the same continuous production processing equipment. Still another object is to permit the production of higher quality, reduced gel content acrylic polymers for use as powder coatings where the polymers are of such a viscosity that gel particles are not readily filtered from them.

These and other objects of the present invention are provided by a process for the continuous production, with reduced gel formation, of free radical addition polymers from ethylenically unsaturated monomers containing at least one free hydroxyl group such as esters of acrylic acid or methacrylic acid containing at least one free hydroxyl group, more preferably from about 0.1% to about 50% by weight of such monomers, from about 0 to about 5% by weight of an alpha-beta unsaturated carboxylic acid having from about 3 to about 8 carbon atoms per molecule, and the remainder of the monomers being free radical addition copolymerizable compounds which are compatible with the other monomers used to form the polymer. The process comprises continuously conducting the free radical addition polymerization in a reactor at a temperature of from about 150° C. to about 310° C. under superatmospheric pressure in the presence of one solvent or a mixture of two or more solvents. The solvent or the volume average of the total solvent mixture (if more than one solvent is used) has an overall calculated root mean square value of the hydrogen bonding and polar contributions of each solvent's solubility parameters ("RMSV") that falls in the range of from about 6 to about 15, and most preferably from about 7 to 13.

Additionally, the solvent or all solvents present as a solvent mixture in total have sufficient volatility under the conditions of temperature and pressure being used to conduct the polymerization are such that any liquid condensate of vapor mixture composed of the monomers and solvents forming on interior surfaces of the reactor equipment located above the surface of the monomer reactants contains at least 50 mole percent, more preferably, at least 60 mole percent, and most preferably, at least 90 mole percent, of the solvent to reduce gel formation on such interior surfaces.

Optionally, but preferably, a free radical initiator is included to provide a source of free radicals to induce polymerization of the monomers.

In a more preferred embodiment, the interior of the continuous reactor and its associated polymer processing equipment that has contact with the reactants during the polymerization process is thoroughly cleaned to remove any gel particles and deposits from previous polymerization runs before the polymerization process is started. Preferably, the cleaning procedure uses one or more solvents and one of the solvents used is NMP.

Thus, in one more preferred embodiment, the process of the present invention involves the continuous polymerization of a free radical initiated polymer using monomers comprising from about 0.1 to about 50% by weight, more preferably from about 5% to about 30% by weight, based on the total amount of monomers used, of a monomer containing free hydroxyl groups such as 2-hydroxyethyl methacrylate ("HEMA"). Optionally, up to about 5% by weight of a monomer containing free carboxyl groups such as acrylic acid or methacrylic acid is included as part of the monomer reactants. The remainder of the monomer charge is selected from copolymerizable monomers such as styrene, alpha-methyl styrene, methyl methacrylate, butyl acrylate, ethyl acrylate, and 2-ethylhexyl acrylate. The polymerization is preferably conducted at temperature of from about 170° C. to about 270° C., and most preferably from about 170° C. to about 240° C. under superatmospheric pressure. The actual pressure values are determined by the temperature used and the ingredients present in the reactor. Optionally, but more preferably, from about 0.05% to about 4%, based on the total weight of the monomers added, of a free radical initiator such as di-tertiary-butyl peroxide is added to the monomer reactants. The solvent or solvent mixture used is from about 5% to 40%, more preferably from 10% to 25%, by weight, based on the total weight of the solvent and monomers. The solvent (or total volume fraction of the solvent mixture) has an RMSV in the range of from about 7 to about 13. The solvent (or solvent mixture) has sufficient volatility under the conditions being used to conduct the polymerization such that any liquid condensate of vapor mixture forming on interior surfaces of the reactor equipment located above the surface of the monomer reactants is calculated to contain at least 60, and most preferably at least 90, mole percent of the solvent to reduce gel formation on such interior surfaces. Examples of such solvents are acetone, methanol, isopropanol, tertiary-butanol, or a 50:50 weight ratio of diethylene glycol monoethyl ether and isopropanol at a temperature of 190° C. and a pressure of 196 pounds per square inch gauge ("psig") (1.35 megaPascals gauge—"mPg") or a 50:50 weight ratio of NMP and isopropanol. The use of one or more solvents meeting both the RMSV criteria and the volatility criteria gives the optimum level of reduced gel formation, particularly when further combined with the preferred step of thoroughly cleaning the interior of the continuous processing equipment, preferably using a solvent which includes NMP.

BEST MODE OF CARRYING OUT THE INVENTION

The free radical addition polymers used in the process of the present invention are well known to those of ordinary skill in the art.

The process of the present invention is applicable to free radical addition polymers which are produced using ethylenically unsaturated monomers containing at least one free alkyl-bonded hydroxyl group such as hydroxy-alkyl acrylates and methacrylates containing an alkylene or substituted-alkylene group having from 2 to 6 carbon atoms to which one or more hydroxy groups are attached. Examples of such monomers are 2-hydroxyethyl acrylate, 2-hydroxyethyl methacrylate, 2-hydroxypropyl acrylate, 2-hydroxypropyl methacrylate, 2-hydroxybutyl acrylate, 2-hydroxybutyl methacrylate, 6-hydroxyhexyl acrylate, 6-hydroxyhexyl methacrylate, 5,6-dihydroxyhexyl acrylate, cyclohexanedimethanol monoacrylate, cyclohexanedimethanol monomethacrylate, diethyleneglycol monoacrylate, diethyleneglycol monomethacrylate, 3-chloro-2-hydroxypropyl acrylate, and 3-chloro-2-hydroxypropyl methacrylate. Other examples of acrylate and methacrylate monomers containing free alkyl-bonded hydroxyl groups include 2-hydroxy-3-phenoxypropyl acrylate, 2-hydroxy-3-phenoxypropyl methacrylate, 2-hydroxymethyl-5-norbornene acrylate, 2-hydroxymethyl-5norbornene methacrylate, pentaerythritol monoacrylate, pentaerythritol monomethacrylate, trimethylolpropane monoacrylate, and trimethylolpropane monomethacrylate. Other ethylenically unsaturated monomers containing free hydroxyl groups may also be useful in the present invention. Preferably, such monomers comprise from about 0.1% to about 50%, more preferably from about 5% to about 30%, and most preferably from about 10% to 20%, by weight of the addition polymer based on the total weight of the monomers being polymerized. Preferably, the monomers are HEMA, 2-hydroxyethyl acrylate, 2-hydroxypropyl acrylate, 2-hydroxypropyl methacrylate, 2-hydroxybutyl acrylate, and 2-hydroxybutyl methacrylate.

Optionally, but less preferably, an alpha-beta ethylenically unsaturated monomer having from about 3 to 8 carbon atoms per molecule which further contains a free carboxyl group is included in an amount of up to about 5%, more preferably no more than about 3%, and most preferably no more than about 2%, by weight of the polymer, based on the total weight of monomers being polymerized. Examples of such monomers include acrylic acid, methacrylic acid, maleic anhydride, fumaric acid and itaconic acid with acrylic acid and methacrylic acid being most preferred if such free carboxyl group-containing monomers are to be used. At times, the inclusion of free carboxyl group-containing monomers may be desirable from a product application standpoint. However, the presence of such groups tends to increase the likelihood of gel particle and deposit formation.

The remainder of the monomers used to produce polymers according to the process of the present invention are unsaturated monomers which are copolymerizable as well as compatible with the free hydroxyl-group containing monomers and, if present, the free carboxyl-group containing monomers. Such monomers include esters of acrylic acid and methacrylic acid with alcohols containing from 1 to 20 carbon atoms such as alkanol esters such as methyl acrylate, methyl methacrylate, ethyl acrylate, ethyl methacrylate, n-propyl acrylate, n-propyl methacrylate, isopropyl methacrylate, n-butyl acrylate, n-butyl methacrylate, isobutyl methacrylate, tert-butyl methacrylate, n-amyl acrylate, 2-ethylbutyl methacrylate, n-hexyl acrylate, cyclohexyl methacrylate, n-hexyl methacrylate, 2-ethylhexyl acrylate, n-decyl acrylate, lauryl acrylate, dodecyl methacrylate; and aromatic esters such as phenyl acrylate and 2-phenylethyl acrylate. More preferred ester monomers are methyl methacrylate, ethyl acrylate, n-butyl acrylate, and 2-ethylhexyl acrylate.

Alcohol ethers such as 2-methoxybutyl methacrylate, 3-methoxybutyl methacrylate and 2-phenoxyethyl acrylate may also be useful in the present invention.

Other monomers which may find use in the present invention are acrylic acid derivatives such as acrylonitrile, methyl-alpha-chloroacrylate, methyl 2-cyanoacrylate, N-ethylacrylamide, and N,N-diethylacrylamide.

Still other monomers which may be useful in the present invention include ethylenically unsaturated monomers which are not based on acrylic acid or methacrylic acid as long as they are compatible with the free hydroxyl groups and other groups present in the polymer. Examples of such monomers include styrene, alpha-methyl styrene, vinyl acetate, vinyl toluene, vinyl pyridine, vinyl pyrrolidone, and the like.

The important aspect is that the monomers used be "compatible" with the hydroxyl-group containing monomers which means that they can be copolymerized with such monomers without unduly reacting with the free hydroxyl groups to form polymers which are completely gelled or which contain significant amounts of gel particles.

Thus, the additional monomers may comprise from about 50% up to about 99.9% by weight of the total amount of monomers, and more preferably from about 60% to about 95% by weight, and most preferably from about 80% to 90% by weight of the total monomers used to form addition polymers by use of the process of the present invention. More preferably, the additional monomers used are styrene, alpha-methyl styrene, methyl methacrylate, butyl acrylate, butyl methacrylate, ethyl acrylate, and 2-ethylhexyl acrylate.

Further information concerning the types of polymers which can be made according to the method of the present invention can be found in U.S. Pat. Nos. 4,414,370 to Hamielec et al.; 4,529,787 to Schmidt et al; and 4,546,160 to Brand et al. noted above. These patents also provide information concerning the type of continuous processing equipment which can be used as well as the processing conditions that are useful.

For example, the continuous polymerization of the above monomers can be conducted in a pressurized CSTR of the type illustrated in the '370 Patent at a reaction temperature of from about 150° C. to about 310° C. and more preferably at a temperature of from about 170° C. to 270° C., and most preferably from about 170° C. to 240° C. The polymerization in the CSTR is conducted under superatmospheric pressure. The actual temperature and pressure used will vary in a way known to those of ordinary skill in the art depending upon the temperatures to be used as well as the composition and molecular weight of the polymer to be made in addition to the solvent considerations which will be discussed below. Preferably, recycling of monomers is used in the polymerization process by recovering unreacted monomers, solvent and low molecular weight oligomers from the reactor in a devolatilizing condenser, purging a portion of the condensed materials, and adding the remainder of the condensed materials along with fresh monomers and solvent to maintain the desired ratio of monomers and level of solvent in the reactor. Such a recycling process is described in the '370 Patent to Hamielec et al.

The reaction temperature used will be higher if thermal initiation is relied upon to produce free radicals to conduct polymerizations according to the present invention using the process described in the '370 Patent to Hamielec et al. While thermal initiation can be used, polymerizations according to the present invention are more preferably conducted using the process described in the '787 Patent to Schmidt et al. or the '160 Patent to Brand et al. using at least about 0.05% and no more than about 4%, and more preferably from about 0.5% to about 1% by weight, based on the total weight of the monomers added, of a well known free radical initiator selected from organic peroxides, aliphatic azo compounds, organic hydroperoxides and the like having suitable decomposition rates at the reaction temperatures to be used.

The type of solvent used in the continuous polymerization process of the present invention constitutes the invention. Generally, the amount of solvent to be used is from about 5% to 40%, more preferably from about 10% to 25%, by weight based on the total weight of the solvent and monomers. While higher amounts of solvent can be used, the foregoing lower amounts are used for economic considerations involving the production of the greatest amount of polymer possible in a unit of time.

The first objective of the present invention is to provide a way to reduce the formation of gel particles below the surface of the monomer reactants. That reduces the formation of gel particles in the resulting polymer and also reduces the formation of gel deposits on reactor surfaces below the surface of the monomer reactants.

The second objective is to reduce the formation of gel deposits above the surface of the monomer reactants such as in the headspace when polymerizations are conducted with the reactor less than completely full. Such deposits also form on the surfaces of piping and entry points to condensers (if used) and evaporators located away from the reactor vessel itself. The vapor from the monomer reactants and solvents may condense there because those surfaces tend to be cooler than the contents of the reactor itself.

We have found that even with the use of the solvent system we describe, it is desirable to insulate and to even heat the piping or other surfaces which are exposed to vapor from the monomer reactants and solvents. This includes vapor entry and return lines to and from evaporator equipment used to separate the polymer from the reactants which are connected to, but somewhat removed from the reactor. This avoids the formation of gel particles and deposits in lines or surfaces exposed to such vapor, see the discussion on heating in the '213 Patent to Yoshida et al. noted above.

In a more preferred embodiment of the present invention, the internal surfaces of the reactor and its associated equipment that contact the reactant monomers and their vapor are preferably thoroughly cleaned using conventional cleaning procedures and agents prior to starting polymerizations using the process of the present invention. The objective is to remove any deposits of gel and polymers from previous polymerizations which may tend to act as "seeds" for the further production of gel particles and deposits. We have found that such cleaning is particularly advantageous when previous polymerizations have involved the production of polymers containing free carboxylic acid groups such those derived from acrylic acid and methacrylic acid. For example, the reactor equipment may be thoroughly cleaned with acid cleaning agents or, more preferably, with solvents such as NMP or solvent mixtures that include NMP to remove such deposits.

To attain the first objective, we have found that appropriate solvents for use in the process of the present invention can be selected by considering the character of solvents with respect to their literature-reported values for hydrogen bonding ("$\delta_H$") and polar contributions of solubility parameters ("$\delta_p$"). We have found that there is a correlation between the RMSV and gel particles (as well as gel deposits on reactor surfaces in contact with the reactant monomers) observed in free radical addition polymers made by continuous polymerization where the polymers were made from monomers containing free hydroxyl groups. The RMSV can be calculated for a single solvent as follows:

$$RMSV = \sqrt{\delta_H^2 + \delta_P^2}$$

For a mixture of two or more solvents, the RMSV value for the mixture ("$RMSV_M$") is the summation of the volume fraction of RMSV for each solvent in the mixture. For a mixture of "n" solvents, $RMSV_M$ can be calculated as follows:

$$RMSV_M = \sum_{n=1}^{n} v_n RMSV_n$$

where $v_n$=volume fraction of species n in the mixture $RMSV_n$=RMSV of species n The RMSV (and $RMSV_M$) was found to correlate with the amount of gel deposits found beneath the surface of the liquid reactant mixture in the reactor tank of a CSTR.

Table I below lists the literature reported values as found in *Solvents Data,* a publication of the Texaco Chemical Company, of Houston, Tex., Publication No. 102-1259, copyright 1989 and *Solvent Selector Chart* from Eastman Chemical Products, Inc. of Kingsport, Tenn., Publication No. M-167R, November, 1992 giving the parameters needed for a number of solvents: "$\delta_H$", "$\delta_p$" and "RMSV" are as defined above. Those of ordinary skill in the art will appreciate that some solvents must be avoided if they detrimentally affect the polymer being made. Thus such solvents would neither be "compatible" with the polymer being made nor useful in the process of the present invention. We have found that the RMSV should be in the range of from about 6 to about 15, and most preferably from about 7 to about 13. We have found that for polymers containing HEMA, a solvent with an RMSV of about 8.5 gave the least amount of gel particles and deposits below the surface of the monomer reactants in a CSTR. One or more such solvents could be used in the process of the present invention.

Such solvents may already have sufficient volatility to achieve the second objective of also reducing the formation of gel deposits in the areas above the liquid reactant surface in the reactor and associated piping and equipment. After extensive studies, we have found that the second objective may be achieved by taking into consideration the nature of the condensed vapor ("condensate") which is likely to form on interior surfaces of the reactor above the liquid level of the reactants. We have found that gel deposit formation on interior surfaces of the reactor can be significantly reduced by using solvents that are sufficiently volatile that the calculated solvent content of such condensate will constitute at least 50 mole percent of the total condensate, and more preferably, at least 60 mole percent of the condensate, and most preferably, at least 90 mole percent of the condensate. By keeping the mole percentage in the above range, the formation of gel deposits above the surface of the monomer reactants is significantly reduced, particularly over extended periods of time. To obtain proper volatility, solvents which do not meet the RMSV criteria such as toluene may be used in combination with solvents that do meet the RMSV criteria as long as the sum of the volume fractions of such solvents meet the $RMSV_M$ criteria.

TABLE I

| Solvent | $\delta_P$ | $\delta_H$ | RMSV |
|---|---|---|---|
| n-Hexane | 0 | 0 | 0.0 |
| Toluene | 0.7 | 1 | 1.2 |
| Propylene glycol monomethyl ether acetate (PMA) | 1.8 | 3 | 3.5 |
| 2-Ethyl-1-hexanol | 1.6 | 5.8 | 6.0 |
| 1-Octanol | 1.6 | 5.8 | 6.0 |
| Tripropylene glycol methyl ether | 2 | 5.7 | 6.0 |
| Acetone | 5.1 | 3.4 | 6.1 |
| Methyl iso-butyl carbinol | 1.6 | 6 | 6.2 |
| Diethyleneglycol butyl ether | 3.4 | 5.2 | 6.2 |
| Propylene glycol t-butyl ether | 2.1 | 6 | 6.4 |
| Ethyl 3-ethoxypropionate | 4.5 | 4.6 | 6.4 |
| Ethylene glycol monobutyl ether | 2.5 | 6 | 6.5 |
| Ethylene glycol monomethyl ether acetate | 4.8 | 4.4 | 6.5 |
| 2-Ethylhexyl acetate | 2.9 | 5.9 | 6.6 |
| Diacetone alcohol | 4 | 5.3 | 6.6 |
| Ethylene glycol 2-ethylhexyl ether | 1.8 | 6.5 | 6.7 |

TABLE I-continued

| Solvent | $\delta_P$ | $\delta_H$ | RMSV |
|---|---|---|---|
| Cyclohexanol | 2 | 6.6 | 6.9 |
| 2-Ethyl-1-butanol | 2.1 | 6.6 | 6.9 |
| N-Methyl-2-Pyrrolidone (NMP) | 6 | 3.5 | 6.9 |
| Dipropylene glycol butyl ether | 3.9 | 5.8 | 7.0 |
| 2-Methyl-1-butanol | 2.3 | 6.7 | 7.1 |
| 1-Pentanol | 2.2 | 6.8 | 7.1 |
| Diethylene glycol butyl ether acetate (DB Acetate) | 2.8 | 6.7 | 7.3 |
| Diethylene glycol monomethyl ether | 3.8 | 6.2 | 7.3 |
| Propylene glycol monobutyl ether | 3.3 | 6.5 | 7.3 |
| Benzyl Alcohol | 3.1 | 6.7 | 7.4 |
| 1-Methoxy-2-butanol | 2.7 | 6.9 | 7.4 |
| Propylene glycol propyl ether | 3.5 | 6.6 | 7.5 |
| Hexanol (2-methyl-1-pentanol) | 4.2 | 6.2 | 7.5 |
| Carbitol ® solvent (diethylene glycol monoethyl ether) | 4.5 | 6 | 7.5 |
| Ethylene glycol hexyl ether | 2.4 | 7.2 | 7.6 |
| sec-Butanol | 2.8 | 7.1 | 7.6 |
| tert-Amyl alcohol | 4.9 | 6.1 | 7.8 |
| Phenol | 2.9 | 7.3 | 7.9 |
| tert-Butanol | 2.8 | 7.4 | 7.9 |
| Tripropylene glycol | 2.3 | 7.6 | 7.9 |
| Ethylene glycol diacetate | 5.1 | 6.3 | 8.1 |
| Dipropylene glycol methyl ether | 2.6 | 7.7 | 8.1 |
| n-Butanol | 2.8 | 7.7 | 8.2 |
| Furfuryl alcohol | 3.7 | 7.4 | 8.3 |
| iso-Butanol | 2.8 | 7.8 | 8.3 |
| Diethylene glycol monoethyl ether acetate | 3.1 | 7.7 | 8.3 |
| Ethylene glycol monoethyl ether | 4.5 | 7 | 8.3 |
| Diethylene glycol monopropyl ether | 2.6 | 8 | 8.4 |
| iso-Propanol (IPA) | 3 | 8 | 8.5 |
| Tetraethylene glycol | 2.8 | 8.2 | 8.7 |
| Ethylene glycol propyl ether | 3.9 | 7.8 | 8.7 |
| n-Propanol | 3.3 | 8.5 | 9.1 |
| Ethylene glycol methyl ether | 4.5 | 8 | 9.2 |
| Propylene glycol propyl ether (PM) | 4.6 | 8 | 9.2 |
| Tetrahydrofurfuryl alcohol | 5 | 7.8 | 9.3 |
| Acetonitrile | 8.8 | 3 | 9.3 |
| 2-Phenoxyethanol | 5.1 | 7.8 | 9.3 |
| Dimethyl sulfoxide | 8 | 5 | 9.4 |
| Hexylene glycol | 4.1 | 8.7 | 9.6 |
| Allyl Alcohol | 5.3 | 8.2 | 9.8 |
| 2-Pyrrolidinone | 8.5 | 5.5 | 10.1 |
| Ethanol | 4.3 | 9.5 | 10.4 |
| Triethylene glycol | 6.1 | 9.1 | 11.0 |
| Methanol | 6 | 10.9 | 12.0 |

We have found that the optimum solvent volatility can be determined using well known chemical engineering calculation methods making use of Raoult's Law and the Antoine Equation to obtain the molar percentage of solvent in the condensate ("MPSC"). The reactor headspace and other portions of the reactor equipment where heated vapor from the reactants and solvent is present is governed by two-phase vapor-liquid equilibria where the partitioning between the liquid and vapor phases can be described by the following equation:

$$p_i = y_i P = x_i p_i^{vap}(T) \tag{1}$$

where $p_i$=partial pressure of species i $y_i \leq$ vapor mole fraction of species i P=total pressure $x_i$=liquid mole fraction of species i $p_i^{vap}(T)$=pure component vapor pressure of species i at temperature T Then the only other equations needed to complete the calculation are those indicating that the sum of the mole fractions of each of the n components must add up to 1 and the sum of the partial pressures of each of the n components must equal the total pressure:

$$\sum_{i=1}^{n} p_i = P \sum_{i=1}^{n} x_i = 1 \sum_{i=1}^{n} y_i = 1 \tag{2}$$

and the equation for the vapor pressure as a function of temperature. This is given by the well-known Antoine Equation:

$$\log(p_i^{vap}) = A - \frac{B}{T+C} \tag{3}$$

where

A,B,C=literature-reported vapor pressure constants[1] for each component

1. Such constants can be found in the *Handbook of Chemistry & Physics*, CRC Press, Cleveland, Ohio, 1975 or on pages 5.29–5.56 of *Langes Handbook of Chemistry*, 14th Ed., McGraw-Hill, Inc., 1992.

T=temperature (°C.)

In the headspace of the reactor, the vapor is believed to be in equilibrium with the unreacted monomers and with the solvent in the liquid phase. In a continuous process, the reactor is operated in a steady-state condition. Thus, one can assume that that the liquid phase composition ($x_i$) is known and constant. One can compute the composition of the vapor by using equation (1) coupled with the Antoine Equation (3) for the vapor pressure of each component as a function of temperature. It was noted that most liquid phase activity coefficients for the preferred monomers and solvents used in the present invention are close to a value of 1. Therefore, it was found that use of the simpler Raoult's Law gave good correlation (within about 5% error) between what was expected by calculations and what was observed experimentally.

Thus, at a given reaction temperature T, one computes the pure component vapor pressure for each component using equation (4). The partial pressure of each species i in the vapor phase is given by $$p_i = x_i p_i^{vap} \tag{4}$$

One can compute the total pressure expected in the reactor by summing all of the calculated partial pressures using equation (3). The vapor phase composition is then simply computed as $$y_i = \frac{p_i}{P} \tag{5}$$

Generally, the top of the metal head of a typical CSTR is known to be much lower in temperature than the monomer reactants below it. Since the reactor head typically has a temperature which is less than the bubble point (the temperature at which the first bubble appears in a multicomponent liquid mixture), total condensation of the vapor mixture occurs on the metal head surfaces. Thus, the composition of the liquid condensing on the metal head surfaces is equal to the vapor composition computed via equations (3)–(5) above.

The same calculations were found to be applicable with regard to vapor found in other parts of the reactor equipment located above the surface of the monomer reactants such as in the piping returning vapor from a wiped-film evaporator. It is possible for such vapor to condense in pipes if the pipe walls are not heated above the dew point ("dp") of the vapor (the temperature at which the first drop of vapor condenses from a multicomponent vapor mixture). To avoid problems with gel formation in this area, such lines are preferably insulated and heated a sufficient amount to prevent such condensation from occurring in such lines.

Depending upon the conditions to be used, one solvent may not be sufficient to achieve both objectives. Calculations and experimentally observed results for several solvents such as diethylene glycol monoethyl ether, PM Acetate, isopropanol, toluene, hexane, acetone, tertiary-butanol, and combinations of solvents such as 50:50 NMP-:isopropanol are given in the Examples.

INDUSTRIAL APPLICABILITY

The process is carried out in a conventional manner of the same type that is used for CSTR and other continuous polymerization processes. This can include tube reactors provided that the residence time for the monomers in the reactor section is sufficient to produce the desired polymer.

The polymers obtained from the process of the present invention are particularly useful as coating compositions when crosslinking agents such as melamine-formaldehyde or polyisocyanate curing agents are included to form a cured film. They can also be used as components for powder coatings when the solvent is removed from the polymer produced by the method of the present invention.

The following Examples are offered to illustrate the invention and facilitate its understanding without limiting the scope or spirit of the invention. Unless otherwise indicated, all parts and percentages reported are by weight.

EXAMPLE 1

This Example describes the results of using different solvents on the formation of gel particles during the continuous production of an acrylic polymer containing 2-hydroxyethyl methacrylate in a pilot plant size CSTR.

In the experimental Runs described in this Example, a three gallon (11.4 liter) capacity, vertical stirred tank reactor was used that was heated or cooled with oil via a reactor jacket. The reactor was heated to and maintained at a reaction temperature of 375° F. (190.6° C.). This reactor was of the same type described in U.S. Pat. No. 4,414,370 to Hamielec et al.

The reactor was thereafter filled to 50% of its volume with a reaction mixture. The reaction mixture was metered in from a feed tank at a constant delivery rate. Polymerization was immediately initiated as the reaction mixture was introduced into the reactor. The contents of the tank reactor were continuously stirred. After the tank reactor was filled to 50% of its volume capacity, an outlet port was opened and the reaction mixture was continuously withdrawn. Simultaneously, fresh reaction mixture was added to maintain the 50% volume fillage level in the reactor tank. For this purpose, the feed rate was maintained at 0.53 pound (0.24 kilograms) per minute per gallon of reactor volume to achieve a residence time of the reaction mixture in the reactor tank of 15 minutes.

To test the effect of the presence of HEMA on startup, the HEMA was left out of the reaction mixture being fed to the reactor until the reactor level and the temperature was steady (typically about one-half hour after the reaction mixture feed to the reactor was started). After the level and temperature became steady, the reaction mixture was composed of 16.1 parts of styrene, 33.06 parts of methyl methacrylate, 16.1 parts of butyl acrylate, 16.95 parts of 2-hydroxyethyl methacrylate, 2.54 parts of alpha-methyl styrene, 15 parts of the solvent described for each Run in Table II below, and 0.25 parts of di-tertiary-butyl peroxide. During startup, the same formulation was used, except the HEMA was omitted.

The tank reactor was connected via piping to a thin (wiped) film evaporator ("WFE"). Upon leaving the reactor tank, the reaction mixture was introduced into the wiped film evaporator at which time the volatile components, including unreacted monomers and by-products, were evaporated and a polymer product was recovered. No recovery or recycling of unreacted monomers was done in this Example or in Examples 2–3 or 5.

Prior to each of the Runs listed in Table II, the reactor was cleaned by charging the reactor with 12 to 15 pounds (5.4 to 6.8 kilograms) of diethylene glycol monoethyl ether and heating it to 300°–350° F. (149°–177° C.). The heated solvent was then drained from the reactor and the reactor was then filled liquid full with diethylene glycol monoethyl ether solvent (about 24 pounds (10.9 kilograms) of solvent) and agitated. The solvent in the reactor was drained over a 10 minute period. The reactor was then manually scrubbed by abrading the interior surfaces with plastic mesh scrubbing pads of the type used to clean household pots and pans without significantly scratching metal surfaces. After cleaning, the interior reactor surfaces were visually clean to the naked eye.

Each Run lasted a total of 6.5 hours of continuous production time before the CSTR was shut down, opened and inspected for deposits of gel. The amount of gel deposits observed on the reactor surfaces (a) below the liquid surface of the reaction mixture ("BLS") and (b) above the liquid surface on the reactor headspace surfaces ("Head Gel") was visually rated on a scale of 1 to 10 with a rating of 1 being no gel observed and a rating of 10 being gross amounts of gel deposits observed. The ratings are listed in Table II. The "Prior Run" column in Table II indicates whether an acrylic polymer containing free carboxyl groups, but no free hydroxyl groups ("Acid") or a hydroxyl-group containing acrylic polymer with no free carboxyl groups ("OH") was made prior to the polymer made in the Run observed. Table II also lists the mole percentage of solvent calculated to be in the headspace vapor ("Liquid Phase Mole % Solvent").

TABLE II

| Run | Solvent | Prior Run | Head Gel | BLS | RMSV | Liquid Phase Mole % Solvent |
| --- | --- | --- | --- | --- | --- | --- |
| 1 | Carbitol ® solvent | OH | 7 | 1 | 7.5 | 12.9 |
| 2 | PMA | OH | 3 | 3 | 3.5 | 38.9 |
| 3 | Toluene | OH | 3 | 7 | 1.2 | 65.2 |
| 4 | Hexane | OH | 4 | 5 | 0 | 83.7 |
| 5 | Acetone | OH | 2 | 2 | 6.1 | 92 |
| 6 | t-Butanol | OH | 2 | 2 | 7.9 | 89.1 |
| 7 | IPA | Acid | 1 | 1 | 8.5 | 93.7 |

Carbitol ® solvent = Diethylene glycol monoethyl ether
PMA = Propylene glycol monomethyl ether acetate
IPA = Isopropanol The results for Runs 1–7 in Table II show the effect of the volatility of the solvent on the formation of gel deposits in the reactor headspace above the reaction mixture in the reactor tank. Where the mole percent of solvent in the condensed liquid phase (which is composed of the condensed solvent and monomers from the reaction mixture) exceeds about 50 mole percent, no gel deposits were observed after 6.5 hours of continuous processing. Significant gel deposits were observed when the solvent content was below 50 mole percent (comparative Runs 3 and 4). Thus, the volatility of the solvent plays a critical role in the present invention which requires that the solvent be at least 50 mole percent of the condensed liquid phase formed from vapor above the reaction mixture in the CSTR.

Table II shows that the solubility parameters of the solvent used also have an effect on the formation of gel deposits as can be seen from comparative Runs 3 and 4.

As previously noted, the WFE lines were found to represent an area that could become clogged with gel deposits. To alleviate potential gel formation on the WFE lines, these lines were insulated to prevent condensation of the vapor passing through them.

EXAMPLE 2

Gel deposit formation occurs both below the surface of the liquid reactant mixture as well as above the surface of the reactant mixture on the headspace surfaces. The Runs in this Example illustrate the effect on gel formation in both areas exerted by (a) the type of solvents used, (b) the nature of the polymer previously made in the CSTR equipment and (c) the procedure used to clean the CSTR equipment when a polymer containing both free acid-functional carboxyl groups and free hydroxyl groups is produced. Such polymers tend to produce a larger amount of gel deposits than acrylic polymers which are free of free carboxyl groups. The same CSTR equipment used in Example 1 was used in this Example. In these Runs, the feed rate was maintained at 0.667 pound (0.30 kilograms) per minute per gallon of reactor volume to achieve an average residence time of the reaction mixture in the reactor tank of 12 minutes. Unlike Example 1, the HEMA was present in the reaction mixture from the start of each Run. Heated oil was circulated through the reactor jacket in the CSTR to maintain a constant reaction temperature of 385° F. (196° C.). As in Example 1, each Run lasted 6.5 hours.

The reaction mixture used in Runs 1–4 and 6–8 was as follows: 11.06 parts of styrene, 49.30 parts of methyl methacrylate, 1.35 parts of glacial acrylic acid, 11.65 parts of butyl acrylate, 7.81 parts of 2-hydroxyethyl methacrylate, 18.40 parts of the solvent described for each run in Table III below, and 0.43 parts of di-tertiary-butyl peroxide.

Run 5 used essentially the same formulation above, but the acrylic acid was deleted from the formulation to make a polymer that did not contain free carboxyl groups ("No Acid"): 11.211 parts of styrene, 49.975 parts of methyl methacrylate, 11.809 parts of butyl acrylate, 7.917 parts of 2-hydroxyethyl methacrylate, 18.652 parts of the solvent described for each run in Table III below, and 0.436 parts of di-tertiary-butyl peroxide.

The "Prior Run" column in Table III has the same meaning as for Example 1.

The "Cleaning" column shows the cleaning treatment used prior to the start of polymerization. "Carb" means the cleaning process used in Example 1.

"NMP" involved an additional measure of cleaning after the "Carb" cleaning was used: Thus, after the "Carb" cleaning was performed, the reactor was heated to 300° F. The reactor was filled liquid full with NMP, agitated for one hour at 300° F. (148.9° C.) and then drained. The reactor was then set for a polymerization Run.

TABLE III

| Run | Solvent | Prior Run | Cleaning | Head Gel | BLS | RMSV | Liquid Phase Mole % Solvent |
|---|---|---|---|---|---|---|---|
| 1 | PMA | Acid | Carb | 8 | 8 | 3.5 | 38.9 |
| 2 | PMA | Acid | NMP | 5 | 4 | 3.5 | 38.9 |
| 3 | IPA | Acid | Carb | 6 | 5 | 8.5 | 93.7 |
| 4 | IPA | Acid | NMP | 2 | 1 | 8.5 | 93.7 |
| 5 | IPA (No Acid) | OH | Carb | 2 | 2 | 8.5 | 93.7 |
| 6 | IPA:NMP 50:50 | OH | Carb | 1 | 1 | 7.8 | 81 |
| 7 | Cyclohexanol | Acid | NMP | 5 | 1 | 6.9 | 44.3 |
| 8 | Methanol | Acid | NMP | 2 | 2 | 12.4 | 97.1 |

The results in Table III show that one or more solvents which possess both good solubility characteristics for the polymer being made as measured by their RMSV and sufficient volatility are needed to achieve the objective of reducing the formation of gel deposits and gel particles in the polymer during the continuous production of free radical addition polymers from unsaturated monomers which include at least one ethylenically unsaturated monomer containing at least one free hydroxyl group. While some gel formation may occur with time regardless of the solvents used, the present invention provides a process for significantly reducing the formation of such gel deposits and particles.

Of all of the Runs, Run 6 using a 50:50 mixture of isopropanol and NMP as the solvent mixture was the best at reducing gel deposit formation below and above the surface of the reactant mixture in the CSTR for the acrylic polymer containing both free carboxyl and hydroxyl groups being made. Excellent results were obtained even though such polymers tend to develop gel deposits faster than acrylic polymers which only contain free hydroxyl groups. In Run 6, the polymer previously made in the CSTR did not contain free carboxyl groups. Essentially no gel formation was observed after 6.5 hours of continuous operation even though the CSTR was only cleaned by the standard (Carb) cleaning method.

Comparative Runs 1 and 2 show the effect of thorough cleaning of the reactor on gel deposit formation. The more rigorous NMP cleaning used for Run 2 resulted in visibly less gel deposit formation than was observed for Run 1.

Comparative Run 3 and inventive Run 4 show the effect of cleaning the CSTR in the case where the previous polymer made was an acrylic polymer containing free carboxyl groups. In spite of the use of IPA which meets both the solvency and volatility criteria, significant amounts of gel deposits were observed both above and below the liquid reactant level in the CSTR for Run 3. Cleaning the CSTR according to the NMP procedure for Run 4 gave very good results.

Run 5 only used a standard (Carb) cleaning procedure, but the polymer produced did not contain any free carboxy groups and the previous acrylic polymer made did not contain any free carboxyl groups. Run 5 resulted in much less gel deposit formation than comparative Run 3. Thus the cleaning, the type of polymer produced and the type of polymer previously made in the CSTR had an effect on gel deposit formation.

Run 7 using cyclohexanol is a comparative Run since the liquid phase mole % solvent was less than 50 mole percent and this was reflected by the rating of 5 for gel deposits found in the headspace of the CSTR.

Run 8 using methanol as the sole solvent had ratings of "2" for both areas of the CSTR inspected which was considered to be a good rating.

Generally, the Runs exhibiting a BLS Gel and Head Gel rating of about 5 or more such as Runs 1–3 and 7 were less desirable in terms of reducing the amount of gel deposits and gel particles in the polymer produced. Runs 4–6 and 8 exhibiting ratings of 2 or less produced much less gel deposits than those such as Runs 1–3 and 7. Thus the objectives of the present invention are achieved by one or more solvents that meet both the solubility (RMSV) criteria and the volatility criteria. The Runs made in this Example represent a more difficult type of polymer to make without the formation of gel deposits since the presence of the free carboxyl groups in the polymer in addition to the free hydroxyl groups tends to form such gel deposits and particles in continuous production equipment. The present invention is useful in reducing the formation of gel deposits and gel particles even under such more difficult conditions. It represents an improvement in gel formation reduction over what would normally be obtained if more conventional solvents such as PMA (see Runs 1 and 2) are used in place of those forming a part of the present invention.

EXAMPLE 3

This Example used polymers containing relatively high levels of HEMA (Run 1) or a combination of a higher level of HEMA (than was used in the previous Examples) plus acrylic acid to provide free carboxyl groups (Run 2).

The reaction mixture used in Run 1 was as follows: 11.93 parts of styrene, 28.66 parts of methyl methacrylate, 7.16 parts of butyl acrylate, 31.82 parts of 2-hydroxyethyl methacrylate, 10 parts of IPA, 10 parts of NMP, and 0.43 parts of di-tertiary-butyl peroxide.

The reaction mixture used in Run 2 was as follows: 11.93 parts of styrene, 36.61 parts of methyl methacrylate, 3.97 parts of glacial acrylic acid, 7.16 parts of butyl acrylate, 19.9 parts of 2-hydroxyethyl methacrylate, 10 parts of IPA, 10 parts of NMP, and 0.43 parts of di-tertiary-butyl peroxide.

Each Run was made in the same manner using the same equipment as described in Example 2 above (HEMA was present in the reaction mixture from the beginning of the Run) with the exception that the NMP cleaning procedure used in this Example ("NMP1") additionally involved more thoroughly cleaning the WFE as follows: The reactor was filled three successive times with 3 gallons (11.4 liters) of NMP and each time the NMP in the reactor was sent through the WFE which was set at 350°–380° F. (176.7°–193.3° C.). After that was completed, the reactor was filled with NMP at 300° F. (148.9° C.), agitated for 3 hours, and then drained. During this time, the WFE was also agitated for 3 hours, then raised to 430° F. (221.1° C.) and set to a vacuum of 21 inches (533.4 millimeters) of mercury and 6 gallons (22.7 liters) of NMP was sent through the WFE through the condensing system. The WFE was then cooled to 360° F. (182.2° C.).

Table IV gives the results of each 6.5 hour Run.

TABLE IV

| Run | Solvent | Prior Run | Cleaning | Head Gel | BLS | RMSV | Liquid Phase Mole % Solvent |
|---|---|---|---|---|---|---|---|
| 1 | IPA:NMP 50:50 | Acid | NMP1 | 4 | 1 | 7.8 | 86 |
| 2 | IPA:NMP 50:50 | Acid | NMP1 | 4 | 1 | 7.8 | 86 |

Excellent reduction in gel deposit formation below the reactant mixture liquid surface was observed for both Runs.

The gel deposits observed in the CSTR headspace were given a "4" rating because the small amount of deposits observed in the headspace had a relatively high molecular weight, but were solvent soluble and not solvent insoluble gel deposits. Thus, the rating was not given because there were a lot of gel deposits that would merit a "4" rating. This rating was given because it was thought that in a longer duration run, significant gel deposits may be observed. In any event, given the polymers produced, the results observed were still believed to represent a significant improvement over the use of solvents which would not meet the RMSV and liquid phase mole % solvent criteria of the present invention.

EXAMPLE 4

In this Example, two 48 hour duration continuous Runs were made in a larger pilot plant (10 gallon (37.9 liter) capacity) CSTR of the type described in Example 1 using isopropanol as a solvent.

The WFE lines in this reactor were both insulated and oil-jacket heated to 400°–500° F. (204.4°–260° C.) to reduce the possibility of gel formation in these lines during each Run.

The cleaning procedure used in these Runs was as follows: The reactor jacket was heated to 350°–400° F. (176.7°–204.4° C.) and the reactor was filled approximately 80% full using about 60 pounds (27.2 kilograms) of Carbitol® solvent which was then agitated for 15 minutes. Ten pounds (4.5 kilograms) of that solvent was sent overhead to the WFE (jacket heated to 450° F. (232.2° C.), 21 inches (533.4 millimeters) of mercury vacuum) to clean the WFE condenser system. The WFE was then cooled to 375° F. (190.6° C.) and the vacuum on the WFE was released to atmospheric pressure. The rest of the Carbitol® solvent was fed from the reactor to the WFE and pumped out from there. The reactor was then heated to 350° F. (176.7° C.), filled liquid full with about 75 pounds (34 kilograms) of NMP and agitated for one hour. This solvent was then fed to the WFE (jacket heated to 350° F. (176.7° C.), no vacuum) and pumped out from there. The reactor system was then flushed with about 20 pounds (9.1 kilograms) of IPA by feeding the IPA through the reactor and then to the WFE.

Run 1 had HEMA in the reaction mixture from the start. In Run 2, the HEMA was not included in the reaction mixture until the reactor level and temperature became steady.

In these Runs, the WFE was used to recover unreacted monomers through its condenser. A substantial amount of the monomers recovered were then recycled back into the CSTR along with fresh monomers and solvent during the Run to maintain the reaction mixture in the CSTR at a constant composition during the Run.

The actual reactor feed mixture (fresh feed plus recycled monomers and solvent) used in Run 1 was as follows: 14.73 parts of styrene, 2.9 parts of alpha-methyl styrene, 37.07 parts of methyl methacrylate, 11.62 parts of butyl acrylate, 16.33 parts of 2-hydroxyethyl methacrylate, 17.1 parts of IPA, and 0.2 parts of di-tertiary-butyl peroxide. The feed rate was maintained at 0.667 pounds (0.30 kilograms) per minute per gallon of reactor volume to achieve a residence time of the reaction mixture in the reactor tank of 12 minutes. The reaction temperature was 190° C. The fresh feed formulation is dependent upon the feed rate and the composition of the monomer mixture in the material being recycled. In Run 1, the fresh feed formula was 20.85 parts of styrene, 2.35 parts of alpha-methyl styrene, 40.28 parts of methyl methacrylate, 13.13 parts of butyl acrylate, 19.82 parts of 2-hydroxyethyl methacrylate, 3.2 parts of IPA, and 0.36 parts of di-tertiary-butyl peroxide.

The actual reactor feed mixture (fresh feed plus recycled monomers and solvent) used in Run 2 was as follows: 11.63 parts of styrene, 1.57 parts of glacial acrylic acid, 51.89 parts of methyl methacrylate, 7.05 parts of butyl acrylate, 7.92 parts of 2-hydroxyethyl methacrylate, 19.5 parts of IPA, and 0.44 parts of di-tertiary-butyl peroxide. The feed rate was maintained at 0.667 pounds (0.30 kilograms) per minute per gallon of reactor volume to achieve a residence time of the reaction mixture in the reactor tank of 12 minutes. The reaction temperature was 196° C. In Run 1, the fresh feed formula was 17.07 parts of styrene, 1.91 parts of glacial acrylic acid, 58.60 parts of methyl methacrylate, 8.98 parts of butyl acrylate, 9.63 parts of 2-hydroxyethyl methacrylate, 3.15 parts of IPA, and 0.65 parts of di-tertiary-butyl peroxide.

Table V gives the results of each 48 hour continuous Run.

TABLE V

| Run | Solvent | Prior Run | Head Gel | BLS | RMSV | Liquid Phase Mole % Solvent |
| --- | --- | --- | --- | --- | --- | --- |
| 1 | IPA | Acid | 2 | 2 | 8.5 | 93.7 |
| 2 | IPA | Acid | 2 | 2 | 8.5 | 93.7 |

These Runs were much longer in duration than those in Examples 1–3, but gave very good results in terms of keeping the amount of gel deposit formation to a minimum. Although Examples 1–3 used Runs lasting 6.5 hours instead of the much longer duration Runs used in this Example, the amount of gel deposits observed after 6.5 hours were found to correlate reasonably well with what was observed after longer continuous polymerization Runs. Thus solvents which gave gel deposit ratings of about 2 or less were found to be most preferred.

EXAMPLE 5

This Example used a combination of solvents where one of the solvents had a relatively high boiling point. As a result, 25% solvent was used instead of the 15% solvent level used in Example 1 to get the liquid phase mole percent of solvent up to 88%. The equipment and procedure followed were the same as described for Example 1 above. The reaction temperature used was 375° F. (190.6° C.) and the residence time in the reactor was 15 minutes.

The reaction mixture used in Run 1 was as follows 14.2 parts of styrene, 29.2 parts of methyl methacrylate, 2.24 parts of alpha-methyl styrene, 14.2 parts of butyl acrylate, 14.94 parts of 2-hydroxyethyl methacrylate, 12.5 parts of Carbitol® solvent, 12.5 parts of IPA, and 0.22 parts of di-tertiary-butyl peroxide.

Table VI gives the results of the 6.5 hour Run 1.

TABLE VI

| Run | Solvent | Prior Run | Cleaning | Head Gel | BLS | RMSV | Liquid Phase Mole % Solvent |
| --- | --- | --- | --- | --- | --- | --- | --- |
| 1 | Carbitol® solvent: IPA 50:50 | Acid | Carb | 2 | 2 | 7.8 | 88 |

The good results obtained were of the same order as those observed for the single solvent methanol in Run 8 of Example 2.

That which we claim is:

1. A process for the continuous production, with reduced gel formation, of free radical addition polymers by free radical addition polymerization from unsaturated monomers which include at least one ethylenically unsaturated monomer containing at least one free alkyl-bonded hydroxyl group, from about 0 to about 5% by weight of an alpha-beta ethylenically unsaturated carboxylic acid having from about 3 to about 8 carbon atoms per molecule, and the remainder of the monomers being free radical addition copolymerizable compounds which are compatible with the other monomers used to form the polymer, wherein the process comprises continuously conducting the free radical addition polymerization in a reactor containing the monomer reactants at a temperature of from about 150° C. to about 310° C. under superatmospheric pressure in the presence of one solvent or a mixture of two or more solvents (a) wherein the solvent or the volume average of the total solvent mixture has an overall calculated root mean square value of the calculated hydrogen bonding and polar contributions of each solvent's solubility parameters that falls in the range of from about 6 to about 15, and (b) where all solvents present taken together have sufficient volatility under the conditions of temperature and pressure being used to conduct the polymerization such that any liquid condensate of a vapor mixture composed of the monomers and solvents forming on interior surfaces of reactor equipment located above the monomer reactants contains at least 50 mole percent of the solvent to reduce gel formation on such interior surfaces.

2. The process of claim 1 which further includes the first step of thoroughly cleaning the reactor and any associated piping and equipment connected to the reactor to remove deposits of polymer or gel prior to beginning the continuous polymerization step.

3. The process of claim 2 wherein the cleaning step is done using a solvent which includes N-methyl-2-pyrrolidone.

4. The process of claim 1 wherein the amount of ethylenically unsaturated monomer containing at least one free hydroxyl group is from about 0.1% to about 50% by weight, based on the total weight of monomers present and the root mean square value is from about 7 to 13.

5. The process of claim 4 wherein the ethylenically unsaturated monomer containing at least one free hydroxyl group is selected from the group consisting of hydroxy alkyl acrylates and hydroxy alkyl methacrylates containing an alkylene group having from 2 to 6 carbon atoms to which the hydroxy group is attached.

6. The process of claim 5 wherein the free radical addition polymerization is conducted at a temperature of from about 170° C. to about 240° C., at least one solvent is selected from the group consisting of isopropanol, acetone, and tertiary-butanol, and the liquid condensate contains at least 60 mole percent of solvent.

7. The process of claim 5 wherein the alpha-beta ethylenically unsaturated carboxylic acid is selected from the group consisting of acrylic acid and methacrylic acid.

8. The process of claim 5 wherein the remainder of the monomers are selected from the group consisting of esters of acrylic acid or methacrylic acid with alcohols containing from 1 to 20 carbon atoms, styrene and alpha-methyl styrene.

9. The process of claim 5 wherein the remainder of the monomers are selected from the group consisting of esters of acrylic acid or methacrylic acid with alcohols containing from 1 to 20 carbon atoms, styrene and alpha-methyl styrene and wherein the alpha-beta ethylenically unsaturated carboxylic acid is present and is selected from the group consisting of acrylic acid and methacrylic acid.

10. The process of claim 1 wherein the overall calculated root mean square value is in the range of from about 7 to about 13.

11. The process of claim 10 wherein at least one solvent is selected from the group consisting of isopropanol, methanol, and tertiary-butanol.

12. The process of claim 1 wherein at least one solvent is selected from the group consisting of isopropanol, acetone, methanol and tertiary-butanol.

13. The process of claim 1 wherein the free radical addition polymerization is conducted in the presence of a mixture of at least two solvents, at least one of such solvents being selected from the group consisting of isopropanol, acetone, tertiary-butanol, methanol and N-methyl-2-pyrrolidone.

14. The process of claim 2 wherein the free radical addition polymerization is conducted in the presence of a mixture of at least two solvents, at least one of such solvents being selected from the group consisting of isopropanol, acetone, tertiary-butanol, methanol and N-methyl-2-pyrrolidone.

15. The process of claim 8 wherein the free radical addition polymerization is conducted in the presence of a mixture of at least two solvents, at least one of such solvents being selected from the group consisting of isopropanol, acetone, tertiary-butanol, methanol and N-methyl-2-pyrrolidone.

16. The process of claim 15 which further includes the first step of cleaning the reactor and any associated piping and equipment connected to the reactor to remove any deposits of polymer or gel prior to beginning the continuous polymerization step.

17. The process of claim 9 wherein the free radical addition polymerization is conducted in the presence of a mixture of at least two solvents, at least one of such solvents being selected from the group consisting of isopropanol, acetone, tertiary-butanol, methanol and N-methyl-2-pyrrolidone.

18. The process of claim 17 which further includes the first step of cleaning the reactor and any associated piping and equipment connected to the reactor to remove any deposits of polymer or gel prior to beginning the continuous polymerization step.

19. The process of claim 8 wherein the overall calculated root mean square value is in the range of from about 7 to about 13 and the liquid condensate contains at least 60 mole percent of solvent.

20. The process of claim 19 wherein the liquid condensate contains at least 90 mole percent of solvent.

21. The process of claim 9 wherein the overall calculated root mean square value is in the range of from about 7 to about 13 and the liquid condensate contains at least 60 mole percent of solvent.

22. The process of claim 21 wherein the liquid condensate contains at least 90 mole percent of solvent.

23. The process of claim 15 wherein the overall calculated root mean square value is in the range of from about 7 to about 13 and the liquid condensate contains at least 60 mole percent of solvent.

24. The process of claim 23 wherein the liquid condensate contains at least 90 mole percent of solvent.

25. The process of claim 16 wherein the overall calculated root mean square value is in the range of from about 7 to about 13 and the liquid condensate contains at least 60 mole percent of solvent.

26. The process of claim 25 wherein the liquid condensate contains at least 90 mole percent of solvent.

27. The process of claim 17 wherein the overall calculated root mean square value is in the range of from about 7 to about 13 and the liquid condensate contains at least 60 mole percent of solvent.

28. The process of claim 27 wherein the liquid condensate contains at least 90 mole percent of solvent.

29. The process of claim 18 wherein the overall calculated root mean square value is in the range of from about 7 to about 13 and the liquid condensate contains at least 60 mole percent of solvent.

30. The process of claim 29 wherein the liquid condensate contains at least 90 mole percent of solvent.

* * * * *